Patented Aug. 23, 1949

2,479,751

UNITED STATES PATENT OFFICE 2,479,751

ISOLATION OF POLYGALACTURONASE

Hans Lineweaver, Berkeley, Rosie Jang, San Francisco, and Eugene F. Jansen, Berkeley, Calif., assignors to the United States of America as represented by the Secretary of Agriculture No Drawing. Application November 26, 1948, Serial No. 62,222

5 Claims. (Cl. 195—65)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to polygalacturonase. This enzyme catalyzes the hydrolysis of the glycosidic linkages between galacturonic acid residues in pectic acid and pectinic acids. The final product in the action of this enzyme on pectic acid is monomeric galacturonic acid.

This invention has among its objects the isolation of polygalacturonase from enzyme preparations containing the same.

Polygalacturonase is present in many commercial enzyme preparations, particularly the pectinase preparations which are produced by culturing of molds or fungi on suitable media. In such pectinase preparations the polygalacturonase is associated with other enzymes, notably pectinesterase, cellulase, amylase, etc. The isolation of polygalacturonase from such complex mixtures has previously been difficult. One known method (Jansen and MacDonnell, Archives of Biochemistry, vol. 8, pp. 97–111) involves subjecting the pectinase to several strongly acid treatments with concentration of the enzyme between the acid treatments. By this procedure, the pectinesterase present as an impurity is preferentially de-activated. However, the strongly acid conditions, having a pH of 0.6 also destroys much of the polygalacturonase, the final product containing only 7% of the original polygalacturonase activity. Another known technique (Kertesz, J. Biol. Chem., vol. 160, p. 149) involves treatment of the pectinase preparation with an ion exchange resin for removal or inactivation of the pectinesterase component. This procedure suffers from the defect that a pure product is not obtained and there is considerable destruction of the polygalacturonase.

We have discovered a comparatively simple and inexpensive method for isolating polygalacturonase from pectinase preparations which furnishes a pure product in high yield.

Briefly described, the process involves contacting a solution of the pectinase preparation with alginic acid whereby the polygalacturonase and certain impurities are adsorbed on the alginic acid. The treated alginic acid is then washed to remove mechanically occluded or loosely bound impurities, then extracted with an aqueous salt solution. This extract is subjected to a mild acid treatment to inactivate residual pectinesterase leaving a solution containing essentially polygalacturonase. This solution may be dialyzed to remove salts and then dried by lyophilization, by subjection to vacuum while in the frozen state, to obtain the solid product.

The following example discloses particular steps and conditions within the scope of this invention, but it is to be understood that this example is given only by way of illustration and not limitation.

In the following example, the enzyme preparations were assayed for polygalacturonase activity by a modified Wilstatter-Schundel hypoiodite method as disclosed by Jansen and MacDonnell (Archives of Biochemistry, vol. 8, pp. 97–112). One unit of polygalacturonase activity is defined as the amount of activity that will release one millimol of galacturonic acid per minute under the conditions described in the Jansen and MacDonnell publication. The expression "PG. u. per mg. TN" employed below is used to express the units of polygalacturonase activity per milligram of total nitrogen in the preparation.

EXAMPLE

*(a) Adsorption on alginic acid*

The starting material was a commercial pectinase preparation which has an activity of 0.24 unit of polygalacturonase activity per milligram of total nitrogen in the preparation. This pectinase preparation was dissolved in sufficient water to obtain 1800 ml. of 5% solution thereof. The solution was cooled to 5% C. and sufficient hydrochloric acid added to adjust the pH to 3.0. 81 grams of powdered alginic acid was wet with water then stirred into the above solution while the temperature was maintained at 5° C. The stirring was continued for 5 minutes and the mixture centrifuged to separate the alginic acid containing adsorbed polygalacturonase. The supernatant liquid was discarded.

*(b) Washing of alginic acid*

The alginic acid containing adsorbed polygalacturonase was washed with one liter of cold (5° C.) 0.1 M aqueous sodium chloride. The purpose of this treatment is to remove certain impurities which are loosely bound to the alginic acid.

*(c) Extraction of polygalacturonase from alginic acid*

The washed alginic acid from step (b) was extracted with 500 ml. of cold (5° C.) 1.0 M aqueous sodium chloride. This extraction was accomplished in three successive extractions using 200 ml. of the solution for the first two extractions and 100 ml. for the last extraction. After each extraction, the extract obtained was immediately adjusted to pH 5 by addition of sodium hydroxide to prevent inactivation of the polygalacturonase. The extracts were combined and found to have an activity of 0.77 PG. u. per mg. TN.

(d) *De-activation of residual pectinesterase*

To the combined extracts from step (c), sufficient hydrochloric acid was added to adjust the pH to 3.2. A few drops of toluene were added to form a film on the surface of the solution and prevent microbial growth. The solution was allowed to remain at room temperature for 18 hours then sufficient sodium hydroxide added to raise the pH to 5. The solution was then placed in a semi-permeable membrane and dialyzed against running water for 5½ hours to remove the inorganic salts. This purified solution of polygalacturonase was then available for use. It had an activity of 1.41 PG. u. per mg. TN. The solution contained 42% of the polygalacturonase activity present in the starting material. If the enzyme is desired in dry form, the solution may be dried in vacuum while in the frozen state.

In order to determine the purity of the product of the example, tests were made for pectinesterase, cellulase, and amylase activity of the original material and final product. It was found that the product of the example contained 0.8% of the pectinesterase activity, 4% of the cellulase activity, and 0.1% of the amylase activity of the original material.

In part (a) of the above example, although the concentration of the pectinase preparation is not critical, enough water should be used to form a solution of the preparation, a concentration of about 5% being convenient. The amount of alginic acid may be varied, however, sufficient alginic acid should be used to adsorb substantially all of the polygalacturonase. In general, 0.05 to 1 gram of alginic acid per unit of polygalacturonase gives good results. It is advisable to wet the alginic acid with water before contacting it with the enzyme solution to facilitate handling. During the adsorption step the pH of the solution should be about 3, to prevent solution of the alginic acid. It is, of course, essential that this material (the alginic acid) remain in a solid or jellied state so that it will act as an adsorbent. If it dissolves in the solution its adsorption properties will be nullified. The adjustment of pH may be made by adding any suitable acid such as hydrochloric, sulphuric, phosphoric, acetic, etc. During the adsorption step it is advisable to keep the system cool, i. e., about 10° C. or less to prevent de-activation of the polygalacturonase at the low pH. If desired, it is possible to raise the temperature to about 20° whereby the adsorption and preferential de-activation of pectinesterase can be performed simultaneously. However, because of manipulation difficulties, it is best to carry out this preferential inactivation in a separate step.

In part (b) of the example, the temperature during washing is also kept at about 10° C. or less to prevent de-activation of the enzyme. The washing solvent may be water or a very dilute solution of an inorganic salt. In general a solution of sodium chloride having a concentration up to about 0.2 M is preferred. Instead of sodium chloride, one may use sodium sulphate, potassium chloride, potassium sulphate, ammonium chloride, ammonium sulphate, magnesium chloride, magnesium sulphate or other water-soluble inorganic salt.

In step (c) of the example, the temperature during the extraction is kept at about 10° C., or less, to prevent inactivation of the enzyme. The extraction solvent preferably an aqueous solution of sodium chloride having a concentration from about 0.8 to 2 M. Although sodium chloride is preferred, any of the other salts previously referred to in the discussion of step (b) may be used. To obtain efficient extraction, it is preferred to extract the alginic acid several times. If the extracts are to be kept for any appreciable time, the pH thereof should be raised to about 5 or over to prevent inactivation of the enzyme. Any of the usual bases such as sodium hydroxide, potassium hydroxide, ammonium hydroxide or carbonates of sodium, potassium, or ammonium are suitable for this purpose. If the extracts are further treated directly then this step may be omitted.

In step (d), the pH of the solution is adjusted to a level from about 3.0 to about 3.5, 3.2 being preferred. Any of the acids mentioned above in the discussion of step (a) may be used. The purpose of this step is to inactivate the pectinesterase. After the inactivation is complete, a basic material is added to prevent further action. Any of the basic materials mentioned in the discussion of step (c) are suitable for this purpose. The pH should be adjusted to about 5 or above to stop the reaction.

Because of its specific activity, the purified polygalacturonase of this invention may be used to separate pectic substances from complex organic compounds or mixtures such as fruit and vegetable materials, foods, animal feeds, etc. Thus the enzyme will hydrolyze compounds containing galacturonic acid radicals linked as they are in pectic acid. The enzyme will not hydrolyze such materials as (a) simple glycosidic uronic acids such as methylgalacturonic acid; (b) glucuronic acid compounds such as mesquite gum, heparin, carboxymethylcellulose, and hyaluronic acid; (c) polymannuronic acid compounds such as alginic acid; (d) glucose and glucose amine containing compounds such as starch, sucrose, maltose, ovomucoid, and heparin; (e) fructose containing compounds such as sucrose and inulin; (f) galactose containing compounds such as mesquite gum and gum tragacanth, which was hydrolyzed only very slowly; and (g) pentose containing compounds such as gum ghatti, mesquite gum, gum arabic, and gum tragacanth.

Having thus described our invention, we claim:

1. The process of isolating polygalacturonase from pectinase preparations which comprises contacting an aqueous solution of the pectinase preparation with alginic acid.

2. The process of isolating polygalacturonase from pectinase preparations which comprises contacting an aqueous solution of the pectinase preparation with alginic acid, separating the alginic acid containing adsorbed polygalacturonase, washing the alginic acid to remove mechanically occluded or loosely-bound impurities, and extracting the alginic acid to remove the polygalacturonase therefrom.

3. The process of isolating polygalacturonase from pectinase preparations which comprises contacting an aqueous solution of the pectinase preparation at a pH of about 5 with alginic acid, separating the alginic acid containing adsorbed polygalacturonase from the solution, washing the alginic acid with a dilute salt solution to remove mechanically occluded or loosely-bound impurities and extracting the alginic acid with an aqueous salt solution having a concentration from about 0.8 to about 2 molar to remove the polygalacturonase therefrom.

4. Process according to claim 2 wherein the extract containing polygalacturonase is subjected to a mild acid treatment to differentially inactivate the pectinesterase which is present as an impurity.

5. Process according to claim 3 wherein the extract containing polygalacturonase is subjected to a mild acid treatment at a pH of about 3.2 to differentially inactivate the pectinesterase which is present as an impurity.

HANS LINEWEAVER.
ROSIE JANG.
EUGENE F. JANSEN.

No references cited.